United States Patent [19]
Porta et al.

[11] 3,857,680
[45] Dec. 31, 1974

[54] CATALYST CARTRIDGE

[75] Inventors: Paolo Della Porta; Tiziano A. Giorgi; Angelo Cantaluppi; Bruno Ferrario; Paolo Montalenti, all of Milan, Italy

[73] Assignee: S.A.E.S. Getters S.p.A., Milan, Italy

[22] Filed: Nov. 1, 1971

[21] Appl. No.: 194,445

[30] Foreign Application Priority Data
   Nov. 3, 1970  Italy.................................. 31307/70

[52] U.S. Cl. ........... 23/288 K, 23/288 R, 23/288 F, 23/288 M, 29/157.3 A, 29/191, 165/179, 252/477 R, 260/348.5 R
[51] Int. Cl...... B01j 9/04, B21d 53/02, B23p 15/26
[58] Field of Search ........ 23/288 R, 288 US, 288 F, 23/288 K, 288 H, 288 L, 288 M; 252/477 R; 29/191, 157.3 R, 157.3 A, 157.3 B US; 165/179; 113/116 Y, 118 B

[56] References Cited
UNITED STATES PATENTS
| | | | |
|---|---|---|---|
| 2,611,585 | 9/1952 | Boling | 165/179 X |
| 2,756,032 | 7/1956 | Dowell | 29/157.3 A UX |
| 2,778,610 | 1/1957 | Bruegger | 23/288 K |
| 2,887,456 | 5/1959 | Halford et al. | 23/288 F UX |
| 3,197,975 | 8/1965 | Boling | 29/157.3 R UX |
| 3,652,317 | 3/1972 | Porta et al. | 117/22 |

OTHER PUBLICATIONS

Orzechowski et al., The Silver Catalyzed Oxidation of Ethylene, Canadian Journal of Chemistry, Vol. 32, 415–431 (1953).

*Primary Examiner*—Joseph Scovronek
*Attorney, Agent, or Firm*—David R. Murphy

[57] ABSTRACT

An arcuately bent, folded catalytic structure having catalyst particles affixed to the surface of thin metallic sheets, the edges of the sheets being thermally adjacent to a source or sink for heat to conduct heat between the catalyst particles and the sink or source to help maintain the catalyst particles in thermal equilibrium.

10 Claims, 21 Drawing Figures

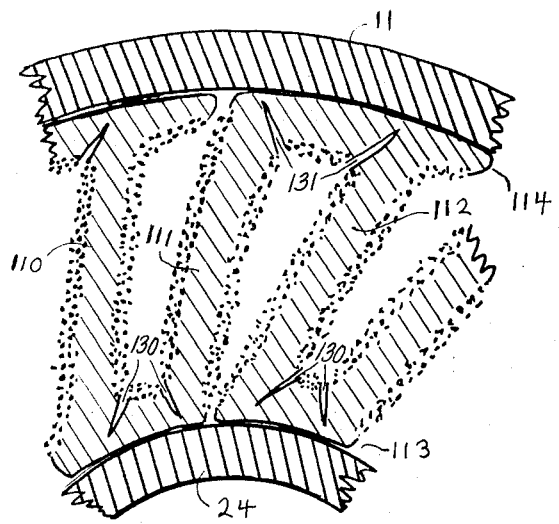
FIG.17
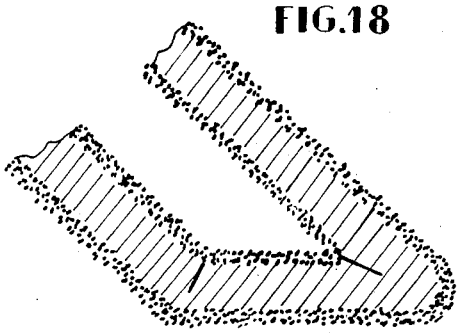
FIG.18
FIG.19
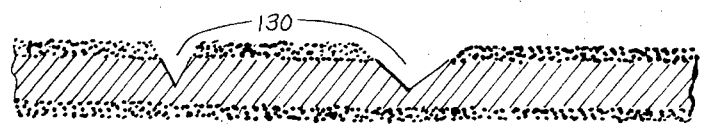
FIG.20
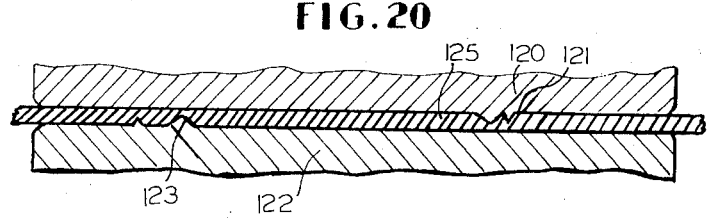
FIG.21
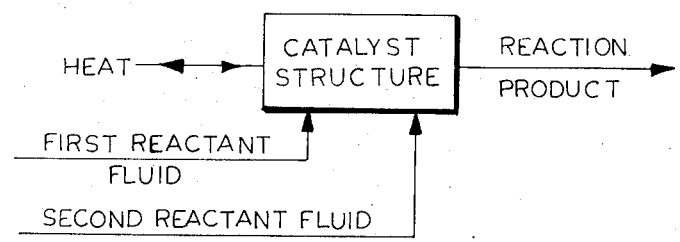

CATALYST CARTRIDGE

BACKGROUND OF THE INVENTION

1. Field of the Invention

This invention relates to catalytic structures, and more particularly to a catalytic structure having an improved heat exchange system.

2. Description of the Prior Art

During catalytic processing, the reactants are normally passed through a bed of porous catalyst particle beads or pellets. In many reactions employing organic materials a fouling carbonaceous deposit appears on the catalyst surface. This fouling may become excessive if the reactants or products remain in contact with the catalyst surface for too long. Fouling results in a change of catalytic activity and also reduces the heat dissipation capacity of the catalyst leading to over-heated regions or "hot spots."

It is desirable and usually necessary to control accurately the temperature at which a catalytic reaction takes place. If the temperature differs from that required, the reaction may give only a very low yield of reaction products, thereby rendering the process uneconomic. Alternatively, the reaction may otherwise proceed too far by producing the desired reaction products and then immediately changing these products into other undesired products. Alternatively, the reaction may be completely different from that required.

But when the reaction taking place is exothermic or endothermic, the heat of reaction involved may make it difficult to maintain an accurately controlled reaction temperature.

Thus, in an exothermic reaction, for example, the heat evolved may result in a localized over-heating of the catalyst, thereby causing a "hot spot." Unless this heat is dissipated quickly, the "hot spot" can cause other, even more exothermic, reactions to take place, thereby liberating even more heat with a consequent growth in size of the "hot spot." This growth can lead to a chain reaction thermal instability of the catalytic structure. The structure can be consequently damaged, for instance by sintering of the catalyst from the excessive rise in temperature.

with conventional catalysts, in highly exothermic or endothermic reactions, the reaction tends to respectively heat or cool the catalyst most strongly in the region of greatest reaction. Such a difference in heating or cooling causes a gradual temperature gradient or variations throughout the catalytic structure. With such temperature gradients, only a limited portion of the catalyst is at the optimum reaction temperature. Thus, the rest of the catalyst is not working at greatest efficiency, and its lifetime can be reduced. Therefore, the efficiency for the catalytic reaction is lowered.

A catalyst is usually provided in a composite pellet-like form comprising an active or catalytic portion supported on a carrier. The carrier is generally a poor conductor of heat. Even if the pellet-like support is metallic, there is still poor thermal contact between individual pellets, because the points of contact between the pellets are very small. Temperature control is, therefore, difficult in the conventional form of fixed bed or column type catalysts.

For some catalytic reactions it has been proposed to incorporate pieces of metal or other heat conductive material in mixture with the catalyst to facilitate heat transfer to the surroundings. The reactants may also be diluted with non-reactive gases or vapors as a further means of achieving temperature control. The temperature can also be controlled by using low flow rates or low conversion levels so that the amount of heat generated is low, but this causes the yield per unit time to be low and the process therefore to be more expensive.

Inhibitors to control the rates of reaction have also been adopted, but these can have the disadvantage of chemically attacking the support or other component of the catalytic device. They can even be responsible for the production of side reactions which give unwanted products from the reactants.

It has also been proposed to control the temperature by supporting the catalyst on a continuous metal support such as a wire mesh or by coating the inside of a hollow tube. In these cases, some compromise has to be made between the variously desired properties. For exampe, if a thin wire is used as a support to permit placing a large amount of catalyst in a relatively small volume, it becomes difficult to remove excess heat quickly and the structure becomes fragile and delicate. If larger diameter wires are used to increase thermal conduction, the size of the reaction chamber increases and the weight therefore also increases. This increase also causes an increase in the expense of constructing and operating the reaction chamber. If an internally coated tube is used, long tubes must be used to have sufficient contact between the catalyst and the reactants. Thus, a relatively high pressure difference between the ends of the tube is required to cause the reactants to flow through the tube. When the catalyst is exhausted the whole tube must be replaced which is an expensive and lengthy process. A further disadvantage of known catalytic reaction chambers is that it is difficult to control the flow characteristics in order to ensure maximum catalytic activity but minimum obstruction to the flow of reactants.

Some or all of the aforementioned disadvantages also arise in other related processes, for example, the catalytic purification of gases.

SUMMARY OF THE INVENTION

The present invention overcomes some or all of these disadvantages by providing a catalytic structure in which particles of catalyst material are affixed to the surface of a metallic sheet, the sheet thereby conducting heat to or from the catalyst particles as required. At least some of the edges of this metallic sheet are situated thermally adjacent to a heat source or heat sink to thereby heat or cool the metallic sheet as required, whereby the catalyst particles tend to be maintained in thermal equilibrium.

Some embodiments of this invention also have the advantage that the catalyzing structure can be easily removed and changed without extensive changes in the remaining structure of the reaction chamber being used. It provides a large amount of catalytically active material in a small volume without impeding the flow of reactants.

The particular construction of the present invention, by giving a more uniform temperature within the catalyzing cartridge also allows the use of a higher reaction temperature without incurring the disadvantages of previous catalyzing reaction chambers.

BRIEF DESCRIPTION OF THE DRAWINGS

FIG. 17 shows a preferred embodiment of the invention in cross section;

FIGS. 18, 19 and 20 illustrate a preferred method of folding the sheet used in the embodiment of FIG. 17; and FIG. 21 illustrates, in block form, a preferred use of the invention.

DESCRIPTION OF THE PREFERRED EMBODIMENT

Figure 1:
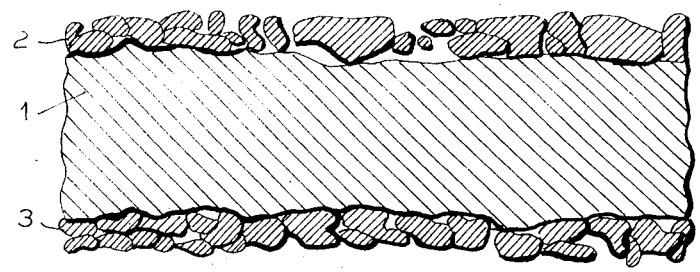
FIG. 1 is a cross-sectional view of a metallic sheet with embedded catalyst particles for use in the present invention.

FIG. 1 is a cross-sectional view of a metallic sheet 1 having catalyst particles 2 and 3 affixed to opposite sides thereof. The construction of such a sheet is fully explained in the prior copending U.S. Pat. application Ser. No. 33,695, filed May 1, 1970, which issued on July 17, 1973, as U.S. Pat. No. 3,746,658, relating to an invention of Paolo della Porta, Tiziano Giorgi, Bruno Kindl, and Mario Zucchinelli, assigned to a common assignee herewith. In the preferred embodiment, a great plurality of catalyst particles 2 and 3 are of a harder material than sheet 1 and are affixed to the metallic sheet by a rolling process which partially embeds the particles in the sheet. Although, for the present invention, the metallic sheet preferably has catalyst particles affixed to both sides thereof, a sheet can be prepared and used with catalyst particles on only one side.

These catalyst particles generally pass a U.S. standard screen of 10 mesh per inch and preferably pass a screen of 100 mesh per inch. They should be retained on a screen of 600 mesh per inch. The catalysts which might be used include, but are not limited to, alumina, zirconia, ferric oxide, ferrous oxide, iron oxide, nickel oxide, zinc oxide, potassium chromate, alumina chloride, tungsten sulfide, silver fluoride, cupric chloride, Ag, Zr, Pt, Au, Ir, Ni, Co, Fe, Pd, Os, Mn, Mo, Rh, etc.

Figure 2:
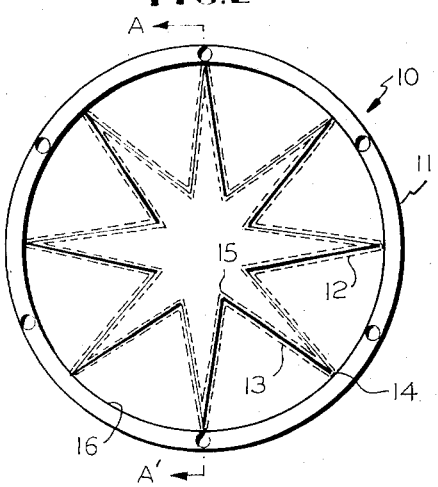
FIG. 2 is an end view of a reaction chamber utilizing a catalyzing cartridge of the present invention.
Figure 3:
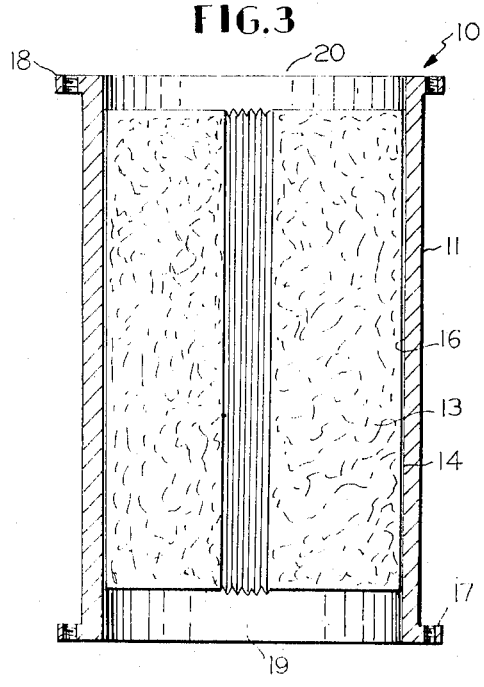
FIG. 3 is a cross-sectional view along the line A—A' of FIG. 2.

FIGS. 2 and 3 disclose a basic embodiment of the present invention, wherein FIG. 3 is a cross-sectional view taken along line A-A' in FIG. 2. A catalytic chamber structure 10 is shown arranged within a cylindrical sleeve or housing 11 to form a reaction chamber. A metallic sheet having catalyst particles affixed to both sides has been folded into a star-shape form 12 about a central axis. The outside diameter of the star shaped cartridge thus formed is preferably made slightly larger than the internal diameter of the catalytic chamber housing such that upon placing the cartridge within said housing the extremities of the catalytic structures exert a force against the housing. The cartridge is thus held firmly but removably in position and is in intimate thermal contact with the housing.

Any metal may be used as the substrate for the catalytic material provided that its hardness is less than that of the said catalytic material. However, the substrate should not chemically react with the reactants or with the catalysis products. The substrate should also have a thermal conductivity as high as possible. it should also have good elastic properties if the intimate thermal contact is required to be provided by the exertion of forces. One preferred substrate metal is aluminum, while bronze, stainless steel, nichrome and copper can also be used successfully.

Star-shaped form 12 is formed of a larger sheet folded to form a numer of smaller metallic sheets such as sheet 13 joined to each other at the edges of the sheets, such as edges 14 and 15. At least some of the edges of the sheet, in this embodiment edge 14, are forced against the inside wall 16 of housing 11 for intimate thermal contact. Thus, the housing 11 can be used as or for connection to a heat source or sink. Flanges 17 and 18 are provided to connect the catalytic reaction chamber to a reaction product input and a reacted product output system (not shown). An external heating or cooling apparatus (not shown) can be placed around housing 11.

Reactants enter the reaction chamber by an entrance port 19, flow through the chamber where catalytic reactions take place, and then reaction products and uncatalyzed reactants leave the chamber by an exit port 20. The flanges can also be used to attach several reaction chambers in series or several cartridges can be placed in series within one housing.

Figure 4:
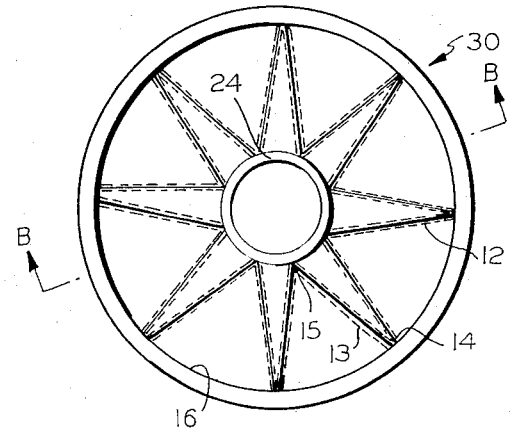
FIG. 4 is an end view of a reaction chamber utilizing another catalyzing cartridge of the present invention.
Figure 5:
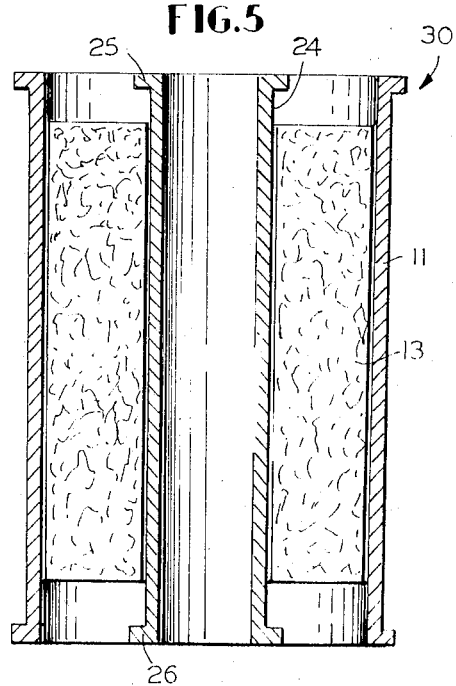
FIG. 5 is a cross-sectional view along the line B—B' of FIG. 4.

FIGS. 4 and 5 show an alternate preferred embodiment of the invention. FIG. 5 is a cross-sectional view taken along line B—B'. A catalytic reaction chamber 30 has been provided which is identical to chamber structure 10 except for the addition of a centrally placed supporting structure 24 which can also act as a second heat source or sink. The internal edge 15 of catalytic structures such as sheet 13 is in intimate thermal contact with support strucure 24 which is also provided with end flanges 25 and 26. The internal edge 15 of each sheet can be held in intimate contact with support 24 by means of mechanical pressure or alternatively by soldering, welding or other convenient means. Elements numbered the same may be constructed in similar manner to those in FIGS. 2 and 3.

Figure 6:
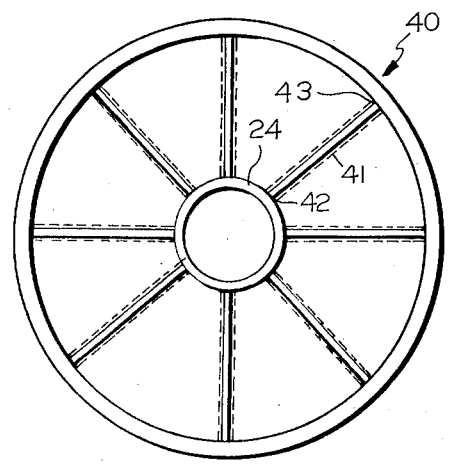
FIG. 6 is an end view of a reaction chamber utilizing yet another catalyzing cartridge of the present invention.

FIG. 6 illustrates a catalytic reaction chamber 40 in which sleeve 11 and supporting structure 24 hold a group of individually formed metallic sheets such as sheet 41, each coated with catalyst particles. The edges 42 and 43 of sheet 41 are respectively thermally adjacent to structure 24 and sleeve 11 of the chamber, which serve as heat-source or heat-sink elements.

Figure 7:
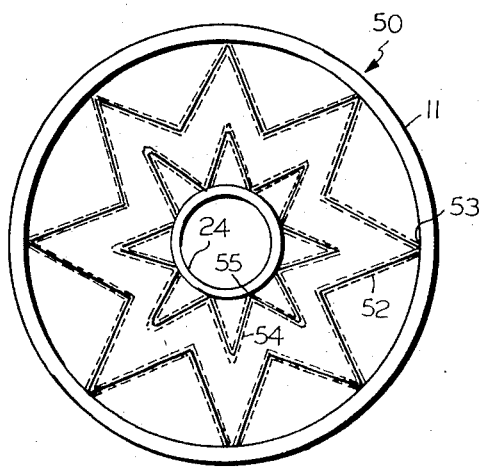
FIG. 7 is an end view of a reaction chamber utilizing another catalyzing cartridge of the present invention.

FIG. 7 illustrates another catalytic reaction chamber 50 including a sleeve 11 and a suppporting structure 24. A first catalyzing cartridge composed of sheets, such as sheet 52, has the edges of its sheets, such as edge 53, located thermally adjacent to the sleeve. A second catalyzing cartridge composed of sheets, such as sheet 54, has the edges of its sheets, such as edge 55, located thermally adjacent to the supporting structure 24.

Figure 8:
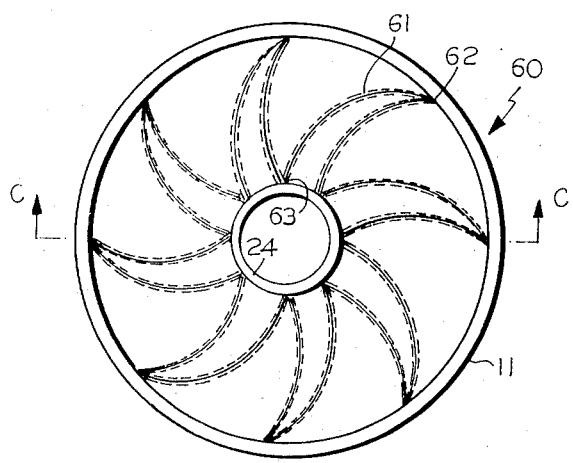
FIG. 8 is an end view of a reaction chamber utilizing a further catalyzing cartridge of the present invention.
Figure 9:
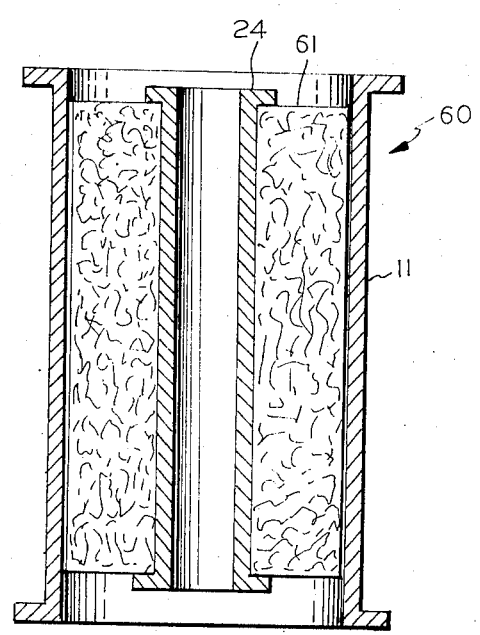
FIG. 9 is a cross-sectional view along the line C—C' of FIG. 8.

FIGS. 8 and 9 illustrate an additional catalytic reaction chamber 60 according to the present invention. FIG. 9 is a cross-sectional view taken along section line C—C' in FIG. 8. Between the supporting structure 24 and the sleeve 11 is placed a catalyzing cartridge folded as a spirated star from a group of spiroid metallic sheets such as sheet 61. Sheet 61 has its two edges 62 and 63, respectively, thermally adjacent to sleeve 11 and supporting structure 24. Preferably, of course, the edges of adjacent spiroid sheets are joined to each other, having been formed by folding a larger sheet.

Figure 10:
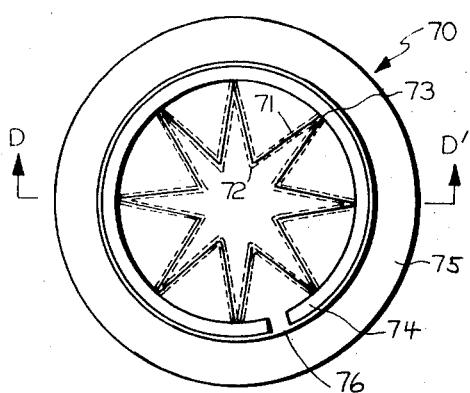
FIG. 10 is an end view of a reaction chamber utilizing yet a further catalyzing cartridge of the present invention.
Figure 11:
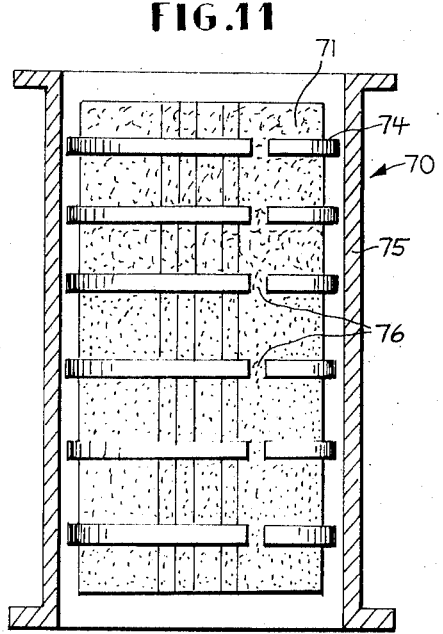
FIG. 11 is a cross-sectional view along the line D—D' of FIG. 10.

FIGS. 10 and 11 disclose a catalytic structure 70 according to another embodiment of the invention. FIG. 11 is a cross-sectional view taken through line D—d' in FIG. 10. The structure 70 is formed by folding a larger sheet into a star-shaped structure formed of sheets such as sheet 71 having edges 72 and 73. The star-shaped structure is retained by metallic rings 74, which are in thermal contact with the edge 73 of each sheet such as sheet 71. A housing 75 is provided in thermal contact with the rings, so that heat is freely conducted between the catalyst and the housing via the sheets and the rings. The rings 74 are provided with a slit or gap 76 so that the catalytic cartridges can be easily inserted into the housing.

Figure 12:
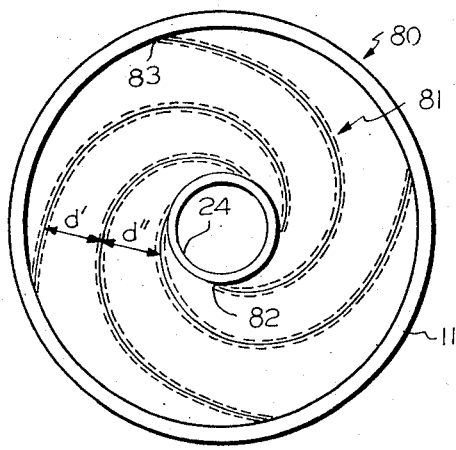
FIG. 12 is an end view of a reaction chamber utilizing another catalyzing cartridge of the present invention.

FIG. 12 shows a catalytic reaction chamber 80 in which the catalytic cartridge comprises an array of catalyzing structures 81 having edges 82 and 83. The curvature of these structures is such that the vertical distance (d'—d'') between any two structures remains constant, thus allowing the fluidodynamic flow characteristics of the reacting gases to be controlled.

Example

A catalyzing device according to FIGS. 2 and 3 is constructed in which the housing 11 is made from stainless steel. A metallic plate 13 of aluminum, of thickness 0.2 mm, is coated by partially embedding thereon by known techniques a finely divided catalytic material, which is a mixture of 70 percent silver of hardness greater than that of the aluminum substrate, and of 30 percent alumina which passes through a U.S. standard screen of 100 mesh per inch and is retained on a U.S. standard screen of 600 mesh per inch. The catalytic material is partially embedded in a density of 50 mg/cm$^2$ both sides of the aluminum strip. The strip is folded into a star-shaped form having an internal diameter of 1 cm, and an external diameter of 5 cm, and is inserted in the housing. The number of folds is such that the cartridge contains 400 gms of silver/liter volume occupied. The outer housing 11 is heated by an oil bath to 250°C, and a mixture of oxygen and ethylene is passes through the catalytic reaction chamber, causing a reaction of the following nature to take place:

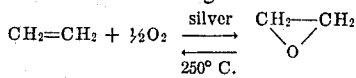

A mixture of unreacted reactants, undesired products and ethylene oxide leave the reaction chamber to be separated by means which form no part of this invention.

Figure 13:
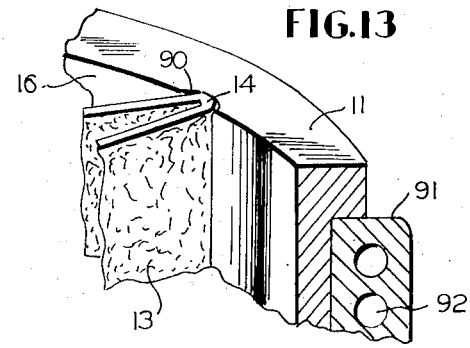
FIG. 13 is a partially cross-sectional perspective view of the point of contact between a folded sheet and the outer sleeve, showing a fluid-operated heat exchanger for use with the outer sleeve.

FIG. 13 is a cutaway view of the point of contact between the sleeve 11 and the plate 13 as illustrated generally in FIGS. 2-5. A groove 90 is preferably cut into the inside wall 16 of the sleeve or housing to receive the folded edge 14 of sheet 13 and the contiguous plate. A greater area of thermal contact is provided between the sheet edge and the sleeve by the use of groove 90 than would be provided by contact between the sheet edge and a relatively smooth inside wall 16. In addition, a heat transfer means 91 can be placed in thermal contact with sleeve 11 for greater heat exchange efficiency. Tubes or pipes, such as tube 92, can be used as means for conveying a fluid having a temperature suitable for adjusting the temperature of the sleeve 11 in the desired direction. The fluid can be either heated or cooled, depending upon whether the catalytic reaction is endothermic or exothermic.

Figure 14:
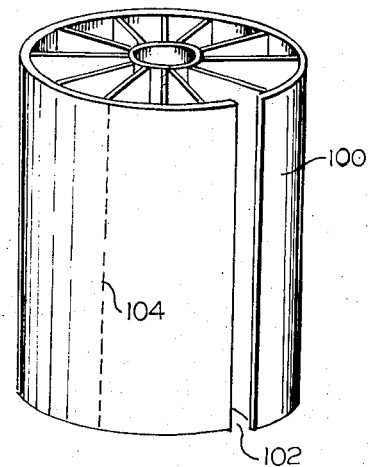
FIG. 14 is a perspective view of another reaction chamber.

FIG. 14 is an additional embodiment of the invention in which the star-shaped catalytic cartridge is welded to the inside of a sleeve cylinder 100 having a gap in a split section 102. the welding is carried out along lines such as (hidden) line 104 on the inside of the cylinder. While welding is technically feasible in any instance, the use of the split cylinder makes it practical, since the cylinder can be slightly compressed to insert it in a more permanent sleeve or housing.

Figure 15:
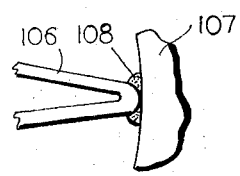
FIGS. 15 and 16 show details of the thermal contact between the sheet and the sleeve.
Figure 16:
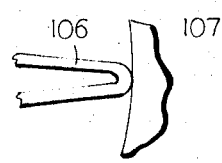

FIG. 15 shows, in closer detail, the attachment of a sheet 106 to a sleeve 107 by a line of welding or brazing 108. Of course, the contact could be made, as shown in FIG. 16, by mere contact between sheet 106 and a smooth sleeve 107, but the resulting area of contact is small, and this is not the most preferred embodiment of the invention.

FIGS. 17-20 illustrate a convenient way to form a cartridge of the generally spirated star shape illustrated in FIG. 8 or FIG. 12.

In FIG. 17 is shown a partial cross-sectional view of several spiroid sheets 110, 111, and 112 arranged in a generally star-shaped cartridge between sleeve 11 and inner support 24. Each sheet is coated with catalyst and has wide edges, for example, edges 113 and 114, situated thermally adjacent respectively to support 24 and sleeve 11.

FIG. 18 illustrates, in cross section, how a sheet, prepared as in FIG. 19, can be folded to the form used in the embodiment of FIG. 17.

FIG. 20 is a cross-sectional view of a step-and-repeat stamping mill comprising a die 120 with a projection 121 and a die 122 with a projection 123 for acting on a catalyst-coated sheet 125. Projection 121 creates a pair of depressions in the sheet which facilitate the folds needed for the position adjacent to the inside support 24, and projection 123 creates a pair of depressions for the outside fold adjacent to sleeve 11. Rollers bearing suitable projections could be used in place of a step-and-repeat stamping mill. The pairs of depressions are created at repetitive spaced intervals on the respective sides of the sheet. Such spaced intervals and the resulting folds are clearly illustrated in FIG. 17.

Thus, FIG. 17 illustrates a sheet of metal folded into several smaller sheets 110, 111, and 112 and others not illustrated. A series of pairs of depressions 130 and 131 are provided on opposite sides of the sheet, as at points 121 and 123 on sheet 125. The pairs of depressions on one side of the sheet may differ somewhat from those on the other side (see FIG. 20) and serve to facilitate folds of first and second types. while these types may differ only in the direction they face, they preferably differ also in construction. while both types of fold are wide to allow good thermal contact, the folds of the first type are wider to take advantage of the generally greater space along the inside surface of sleeve 11 than is available to folds of the second type along the outside surface of inside support 24. A plurality of pairs of depressions of both type are repetitively spaced on respectively alternate sides of the sheet as generally indicated in FIG. 17 to allow proper dimensioning of the folded sheet.

FIG. 21 illustrates the preferred functioning of the catalytic structure disclosed herein. A first reactant fluid and a second reactant fluid enter the catalytic structure, react in the presence of the catalyst particles, and are expelled as a reaction product. Heat is added or removed as necessary to maintain temperature stability.

Although the invention has been described in considerable detail with reference to certain preferred embodiments thereof, it will be understood that variations and modifications can be effected within the spirit and scope of the invention as described above and as defined in the appended claims.

What is claimed is:

1. a catalyst structure comprising:
   A. a thin sheet having two opposite sides and being formed of a metal of a given hardness,
   B. a great plurality of catalyst particles having a hardness greater than said given hardness and being partially embedded in a surface on each of said two opposite sides of said sheet,
   C. said sheet being folded to form a plurality of smaller sheets joined at edges of said smaller sheets to adjacent smaller sheets to form radially disposed segments of said smaller sheets which are all arcuately bent in the same direction, whereby alternate edges of said smaller sheets form outer edges and
   D. a mass situated thermally adjacent to the outer edges of the sheets for conductive exchange of heat with said smaller sheets through said edges.

2. A catalyst structure according to claim 1 wherein said mass further comprises:
   A. an outer sleeve having a substantially cylindrical inner surface,
   B) an inside support having a substantially cyclindrical outer surface,
   said folded sheet being arranged within said outer sleeve with each of said smaller sheets having one edge thermally adjacent to said outer sleeve 3. A catalyst structure according to claim 2 wherein said sleeve is provided with a gap in a split section of the sleeve, whereby the sleeve can be slightly compressed.

4. a catalytic structure according to claim 2 wherein said substantially cylindrical inside surface is grooved to receive the edges of said smaller sheets in close thermal contact.

5. A catalyst structure according to claim 1 wherein said mass further comprises:
   A. an outer sleeve having a substantially cylindrical inner surface, and
   B. means for conveying a fluid of a suitable temperature for exchanging heat with said outer sleeve,
   said folded sheet being arranged in thermal contact with said outer sleeve for said conductive exchange of heat.

6. A catalyst structure according to claim 1, wherein said mass comprises a plurality of rings thermally adjacent to at least some of said edges, said rings being split to allow said rings to be slightly compressed.

7. A catalyst structure according to claim 1 wherein said mass further comprises:
   A. an outer sleeve having a substantially cylindrical inner surface, and the said catalyst structure further comprises:
   B. an inside support having a substantially cylindrical outer surface,
   wherein said radially disposed segments are placed between the outer sleeve and inside support whereby alternate edges of the smaller sheets form outer edges and the remaining edges form inner edges so that at least some of the outer edges are in contact with said inner surface of the outer sleeve and at least some of the inner edges are in contact with said outer surface of the inside support.

8. a catalyst structure comprising a folded sheet having a great plurality of catalyst particles partially embedded in the surface of the sheet wherein the sheet is folded along lines which are parallel to one another and are perpendicular to the running length of the sheet wherein said lines define radially disposed segments of the sheet which are all arcuately bent in the same direction, whereby said radially disposed segments of the folded sheet are formed into a generally cylindrical shape, the outer extremities of which are in thermal contact with the smooth inner wall of a heat exchanger tube.

9. A catalyst structure comprising:
   A. a thin metal sheet folded to form radially disposed segments which are attached to each other at their edges and arcuately bent in the same direction,
   B. a plurality of catalyst particles embedded in the thin metal sheet, and
   C. a heat exchanger encircling the radially disposed segments whereby the heat exchanger is in thermal contact with the radially disposed segments.

10. A catalyst structure comprising:
   A. A thin metal sheet folded to form arcuately bent radially disposed segments which are attached to each other at their edges,
   B. a plurality of catalyst particles embedded in the thin metal sheet, and
   C. a heat exchanger encircling the radially disposed segments whereby the heat exchanger is in thermal contact with the radially disposed segments.

* * * * *